United States Patent [19]

Zaunberger et al.

[11] 4,327,603

[45] May 4, 1982

[54] COMPACT TRANSMISSION FOR TRACKED VEHICLES

[75] Inventors: Franz X. Zaunberger, Augsburg; Artur Kugler, Neusass, both of Fed. Rep. of Germany

[73] Assignee: Zahnraderfabrik Renk A.G., Augsburg, Fed. Rep. of Germany

[21] Appl. No.: 148,971

[22] Filed: May 12, 1980

[30] Foreign Application Priority Data

May 23, 1979 [DE] Fed. Rep. of Germany ....... 2920820

[51] Int. Cl.³ .................... F16H 47/08; B62D 11/00; F16H 37/06
[52] U.S. Cl. .................................. 74/688; 74/720.5; 74/665 T; 180/6.44
[58] Field of Search .................. 192/3.27, 49, 115; 74/677, 688, 694, 695, 682, 606 R, 720.5, 665 T, 730; 180/6.7, 6.44

[56] References Cited

U.S. PATENT DOCUMENTS

| | | | |
|---|---|---|---|
| 3,373,636 | 3/1968 | Livezey et al. | 180/6.7 X |
| 3,425,296 | 2/1969 | Livezey | 180/6.7 X |
| 3,534,635 | 10/1970 | Polak | 74/720.5 |
| 3,601,211 | 8/1971 | Finke | 180/6.7 X |
| 3,772,939 | 11/1973 | Hause | 74/677 |
| 3,966,005 | 6/1976 | Binger | 74/720.5 |
| 4,184,387 | 1/1980 | Kiritani et al. | 74/720.5 |
| 4,191,072 | 3/1980 | Ehrlinger | 74/606 R |

Primary Examiner—George H. Krizmanich
Attorney, Agent, or Firm—Natter & Natter

[57] ABSTRACT

A tracked vehicle transmission provides reduced length between an engine output shaft and a transversely oriented main shaft which drives the vehicle tracks. The transmission includes a torque converter having an output shaft which extends across the main shaft. The primary side of the torque converter drives a steering unit and a power take-off shaft which includes a flow brake. The torque converter output shaft drives the main shaft through a gear train on the side of the main shaft opposite the converter. The gear train includes bevel gears which engage a pair of reversing clutches which drive planetary speed change gear sets. A pair of speed change gear sets may be positioned adjacent each of the reversing clutches or a single speed change gear set may be provided depending upon space requirements and installation conditions. The steering unit is mounted to the upper transmission casing as a single subassembly and is positioned above the main shaft in an area partially enclosed by the torque converter and the reversing clutches.

16 Claims, 4 Drawing Figures

COMPACT TRANSMISSION FOR TRACKED VEHICLES

BACKGROUND OF THE INVENTION

1. Field of the Invention

This invention relates generally to transmissions for tracked vehicles such as military tanks and more specifically to transmissions which include a hydrodynamic converter, a main shaft arranged on an axis transverse to the converter and a steering unit wherein the transmission components are arranged in a novel space and weight saving configuration.

2. Brief Description of the Prior Art

Transmission systems for tracked vehicles have employed torque converters for driving transversely oriented main shafts. Additionally included as part of such transmissions were reversing gears, main shaft speed change gears and a steering drive which engaged planetary differential gears through a zero or neutral shaft.

Typical examples of such prior transmission systems were described in United Kingdom Pat. No. 1,526,542 entitled "Gear Box for Controlling Endless Track Vehicles" and in German Pat. No. 1,655,915, both issued to the assignee of the present invention.

Among the disadvantages of such transmission systems have been the prior design of the gearing arrangements and component placement which resulted in extended distances between the torque converter and the transmission output shaft. One of the reasons for such prior configurations was that bevel gear assemblies and other equipment such as steering drives were often positioned between the torque converter and the transmission main shaft. The size of the transmission systems were of course critical in the design of the tracked vehicle itself and affected vehicle weight, engine space, engine power requirements and total vehicle cost.

In one attempt at reducing the space requirements of such transmission systems, the torque converter was positioned along an axis parallel or coincident with rather than transverse to the main shaft. This approach suffered significant drawbacks, however, because the engine output shaft was transverse to the converter input shaft. As a result, power transfer gear trains were required between the engine and the converter.

These gear trains were subject to substantial vibration stress, especially in vehicles driven by reciprocating piston engines. Because of the stresses involved, the gears were required to be massive. As a result, the weight and cost of the transmission increased. Alternatively or conjunctively with the heavy mass gear trains, additional vibration isolation devices such as vibration damping couplings were required. As a result, space, weight and cost reduction were not attainable with this prior approach.

Other problems which have been encountered with prior tracked vehicle transmission systems included difficulties in assembly and servicing which have been due to the fact that component subassemblies have not generally been constructed as units capable of easy independent initial installation or subsequent replacement.

In United Kingdom Pat. No. 1,526,542, a recognition of this problem was demonstrated and transmission subassemblies which could be replaced without substantial transmission dismantling were disclosed. These subassemblies were accessed through removable covers in the transmission casing. Even with the structure suggested in this patent, the replacement of subassemblies was still cumbersome, components within the casing were still difficult to reach and the installation of replacement units including alignment and mounting remained a formidable task.

The present invention deals with a further problem which has been encountered with braking systems of prior tracked vehicle transmission systems. Flow brakes have been employed as an adjunct to the main braking system of the vehicle which usually included disc brakes. In the past, the flow brake was driven by the transmission main shaft. The effectiveness of such flow brakes decreased with shaft speed, however, and little or no braking effect was achieved when the vehicle was driven slowly. As a result, relatively large, heavy and costly flow brakes were required.

SUMMARY OF THE INVENTION

In compendium, the present invention comprises a transmission system for a tracked vehicle wherein an engine driven torque converter is positioned along an axis transverse to the transmission main shaft. The converter output shaft extends across the axis of the main shaft at an elevation different from that of the main shaft. Coaxial with the main shaft is a hollow shaft having a pair of spaced reversing clutches. The clutches are driven in opposite directions by the converter output shaft through a bevel gear assembly. Selective engagement of the clutches reverses the direction of hollow shaft rotation. The hollow shaft engages the main shaft through at least one planetary speed change gear set.

A steering unit is nested above and overlies the main output shaft for space conservation. The steering unit engages a planetary gear set at each end of the main shaft through separate gearing which is driven by a zero (neutral) shaft. To facilitate assembly and repair, the steering drive unit is mounted to an upper casing of the transmission to form a single assembly. Servicing of the steering drive requires only removal of the upper casing assembly. Alignment of a replacement steering drive is automatically assured when a new upper casing assembly is positioned and secured.

The steering unit and a power take-off shaft which includes a flow brake are both driven from the primary side of the converter. The flow brake thus operates at engine speed rather than main shaft speed to provide improved braking efficiency at lower vehicle speeds.

From the foregoing summary, it will be appreciated that it is an object of the present invention to provide a tracked vehicle transmission system of the general character described which is not subject to the disadvantages aforementioned.

Another object of the present invention is to provide a tracked vehicle transmission system of the general character described which is suitable for economic mass production fabrication.

An additional object of the present invention is to provide a tracked vehicle transmission system of the general character described which optimizes component placement to achieve a reduced size.

A further object of the present invention is to provide a tracked vehicle transmission system of the general character described which employs a torque converter having an output shaft of reduced length.

Another object of the present invention is to provide a tracked vehicle transmission system of the general character described wherein a steering unit is nested over a transmission main shaft for space conservation.

A further object of the present invention is to provide a tracked vehicle transmission system of the general character described with simplified assembly and repair accessibility.

Yet another object of the present invention is to provide a tracked vehicle transmission system of the general character described wherein the efficiency of an auxiliary flow brake is not reduced with a reduction in vehicle speed.

Other objects of the present invention in part will be obvious and in part will be pointed out hereinafter.

With these ends in view, the invention finds embodiment in certain combinations of elements and arrangements of parts by which the said objects and certain other objects are hereinafter attained, all as fully described with reference to the accompanying drawings, and the scope of which is more particularly pointed out and indicated in the appended claims.

BRIEF DESCRIPTION OF THE DRAWINGS

In the accompanying drawings in which are shown some of the various possible exemplary embodiments of the invention.

DESCRIPTION OF THE PREFERRED EMBODIMENTS

Figure 1:
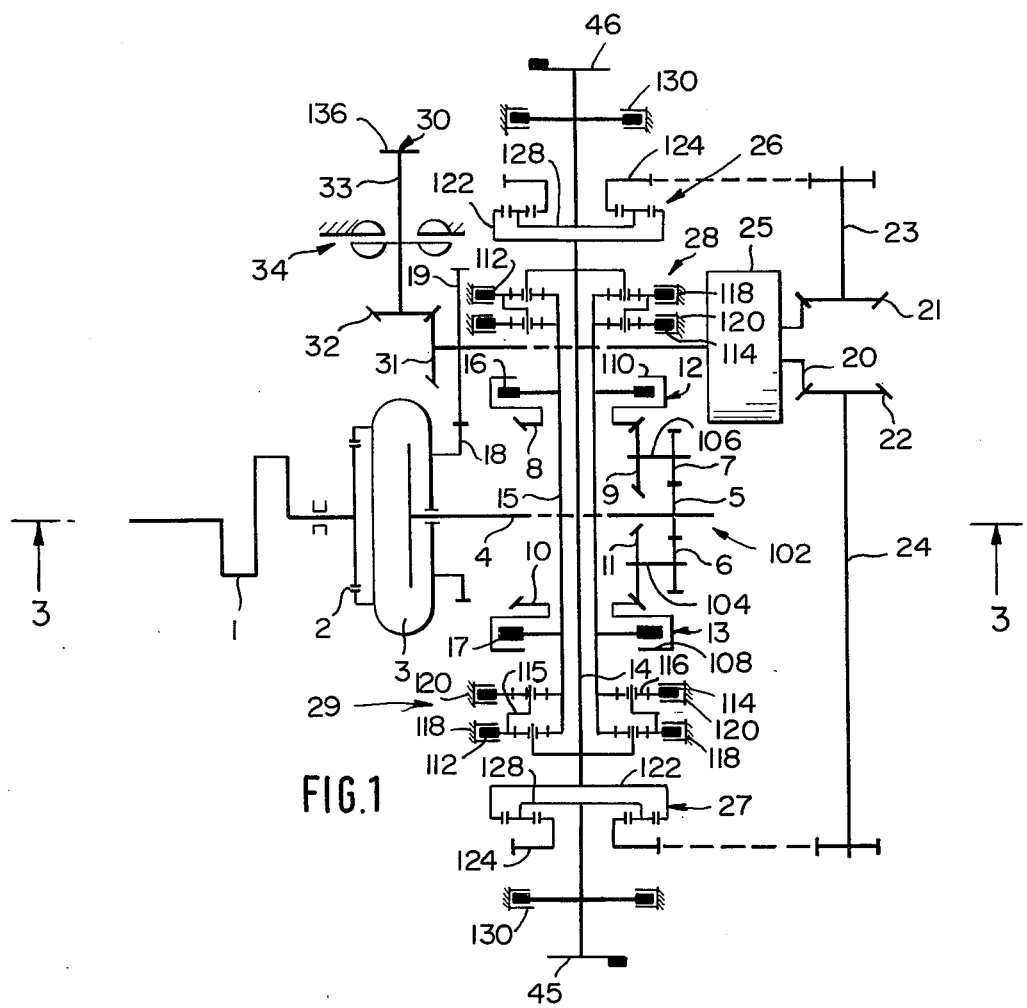
FIG. 1 is a schematized diagrammatic representation of a transmission system constructed in accordance with and embodying the invention wherein details of some components have been omitted and the spacial relationship between components has been altered to better illustrate the driving interconnection between various elements.
Figure 3:
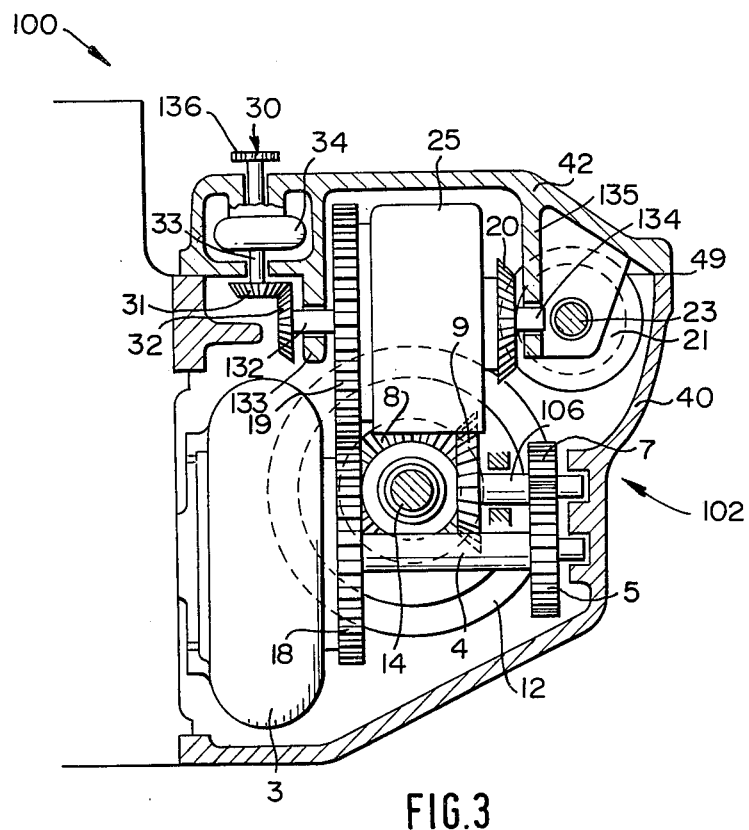
FIG. 3 is a longitudinal cross-sectional view through a transmission system constructed in accordance with the embodiment of FIG. 1 as assembled in a casing, the same being taken substantially along line 3—3 of FIG. 1 and showing the spacial relationships between components to a greater degree of accuracy than illustrated in FIG. 1.

Referring now in detail to the drawings and in particular to the embodiment of the invention shown in FIGS. 1 and 3, the reference numeral 100 denotes generally a compact transmission system for full track (chain tread) vehicles constructed in accordance with and embodying the present invention. The transmission is driven by the vehicle engine and the reference numeral 1 refers to the engine crank shaft. The engine is coupled to drive a hydrodynamic torque converter 3 through a pinion 2 which engages the primary side of the converter 3. If necessary, mechanical bridge couplings such as universal joints and the like may be positioned between the engine and the torque converter 3.

In this arrangement, the converter 3 is employed as an engine flywheel as well as for damping vibrations.

Pursuant to the present invention, the torque converter 3 is positioned close to a main shaft 14 of the transmission 100, which shaft extends along an axis transverse to that of the torque converter 3. This relationship can be best seen in FIG. 3 which also illustrates a converter output shaft 4 extending across and beneath the main shaft 14 and journalled in a suitable socket formed in a lower transmission casing 40.

As previously discussed, the torque converter output shaft 4 is in driving engagement with the main shaft 14 through a gear train 102 and a pair of reversing clutches. In accordance with the invention, the gear train is positioned on the side of the main shaft which is opposite the torque converter 3. The gear train 102 includes a pinion 5 fixed to the output shaft 4 which drives a pair of shafts 104, 106 through a pair of pinions 6, 7 respectively. Each shaft 104, 106 drives an associated reversing clutch for the purpose of controlling the direction of rotation of the main shaft 14.

The shaft 104 includes a bevel gear 11 which engages a mating bevel gear 10 fixed to a clutch drive 108 of a reversing clutch 13. Similarly, the stub shaft 106 includes a bevel gear 9 in driving engagement with a bevel gear 8 which rotates a clutch drive 110 of a reversing clutch 12. It should be appreciated that the gear train 102 drives the clutch drives 108 and 110 in opposite directions.

Each clutch 12, 13 includes a clutch disc 16, 17 which is selectively engaged with the respective drive elements. Both the clutch discs 16, 17 are in driving engagement with a hollow shaft 15 within which the main shaft 14 rotates. Depending upon the desired direction of rotation of the main shaft 14, either the clutch 12 or the clutch 13 will be engaged with its associated drive.

A pair of planetary speed change gear assemblies 28, 29 interconnect the hollow shaft 15 and the main shaft 14. Each planetary speed change gear assembly includes an annulus 112 and a further annulus 114. The annulus 112 is connected to a cage 115 of a planet gear 116 which in turn engages the annulus 114. Each annulus 112, 114 is controlled by an associated coupling 118, 120 respectively. By selectively engaging either coupling 118, 120, the driving ratio between the speed of the hollow shaft 15 and the main shaft 14 is varied.

The main shaft 14 drives a planetary differential gear set 26, 27 by engagement with an annulus 122. A sun gear 124 of each differential gear set 26, 27 is in driving engagement with a zero (neutral) shaft 23, 24 of a steering mechanism to be described hereinafter.

The vehicle chain or track (not shown) is driven by a sprocket wheel 45, 46 which engages a cage 128 of the planetary gear sets 26, 27, respectively. The shaft joining the cage 128 and the sprocket wheel 45, 46 is provided with a multi-disc brake 130 for vehicle braking purposes.

The steering mechanism includes a steering drive unit 25 which is positioned above the main shaft 14. The drive unit 25 occupies a space partially enclosed by the converter 3 and the reversing clutches 12, 13, as illustrated in FIG. 3, rather than in the position as shown in FIG. 1.

The steering mechanism may comprise a hydrodynamic/hydrostatic drive unit 25 such as that disclosed in German Pat. No. 1,480,725. Furthermore, the steering mechanism may be designed as a single radius, multiple radius or infinitely variable drive.

The input to the steering drive unit 25 includes a pinion 18 driven by the primary side of the torque converter 3 which engages a gear 19 journalled for rotation in an upper casing 42 of the transmission. The gear 19 is fixed to a shaft 132 which is journalled through an aperture in a flange 133 of the upper casing 42 as shown in FIG. 3.

Figure 2:
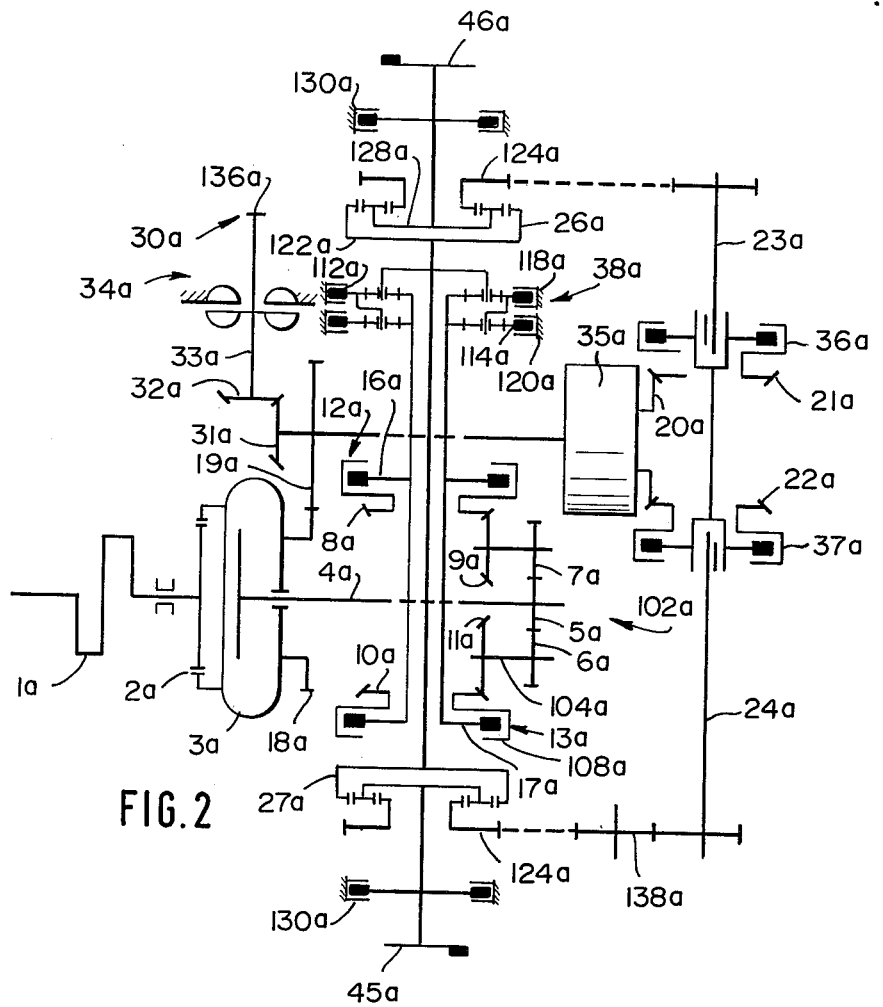
FIG. 2 is a similar schematized diagrammatic representation of a further transmission system constructed in accordance with and embodying an alternate embodiment of the invention wherein a different speed change gear assembly is provided and wherein a modified steering unit is employed.

The gear 19 provides the input to the steering unit 25 while the steering unit output includes a bevel gear 20 fixed to a shaft 134 which is journalled through an aperture in a similar flange 135 of the upper casing 42. The steering unit 25 may drive a zero shaft in a conventional manner as an infinitely variable drive such as shown in FIG. 2 of German Pat. No. 1,480,725 which is incorporated herein by reference.

The bevel gear 20 engages a pair of further bevel gears 21, 22 to rotate a pair of zero (neutral) shafts 23, 24, respectively, in opposite directions. The neutral shafts 23, 24 include a pair of spur gears adjacent their ends. The neutral shaft spur gears drivingly engage the sun gears 124 of the differential gear sets 26, 27. It should be noted that the neutral shafts 23, 24 are journalled for rotation within the lower casing 40.

In accordance with the invention, the upper casing 42 with the steering unit 25 mounted between the flanges 133, 135 comprises a single subassembly. In order to assemble the transmission 100 or for the purpose of replacing the steering drive 25, the entire subassembly is treated as a single unit. Alignment and registration of the steering unit 25 with the driving gear 18 and the take-off bevel gears 21, 22 is accomplished by registering the upper casing 42 with the lower casing 40 along a parting line 49.

The upper casing 42 additionally includes a power take-off 30 for driving auxiliary devices such as a hydraulic pump or a cooling fan. The power take-off 30 includes an output pinion 136 which is fixed to a vertical shaft 33. The shaft 33 is journalled for rotation within the upper casing 42. A bevel gear 32 fixed to the opposite end of the shaft 33 is in engagement with a further bevel gear 31 for driving the power take-off 30. The bevel gear 31 is fixed to the horizontal shaft 132 which is in turn driven through the gear 19 and the pinion 18.

In accordance with the present invention, a hydraulic flow brake 34 includes a rotor driven by the vertical shaft 33. As such, the flow brake rotor is driven from the primary side of the torque converter 3. Since the flow brake 34 is not driven from the main shaft 14, it is not susceptible to decreased efficiency at low vehicle speeds. By driving the flow brake from the primary side of the torque converter 3, the flow brake is operating at a relatively high speed in all conditions and the optimum braking effect can be achieved.

In FIG. 2 an alternate embodiment of the invention is shown wherein like numerals denote corresponding components of the prior embodiment bearing the suffix "a". In this embodiment, a single planetary speed change gear is employed to provide an asymmetrical gear system. In addition, the steering drive is of modified design and provides a twin radius superposition steering gear with a pair of clutches on the output for driving zero (neutral) shaft portions in the same direction.

A compact transmission 100a of this embodiment is driven by an engine crank shaft 1a which engages the primary side of a torque converter 3a in a manner identical to that described with reference to the previous embodiment. Furthermore, an output shaft 4a of the torque converter 3a extends under a main shaft 14a and drivingly engages the main shaft through a gear train 102a including a plurality of pinions 5a, 6a, 7a and bevel gears 8a, 9a, 10a, and 11a to rotate clutch drives of a pair of reversing clutches 12a, 13a in a manner identical to that previously described.

The selective engagement of the clutch drive of either clutch 12a, 13a will cause a hollow shaft 15a to rotate in either of two directions. The shaft 15a drives a planetary speed change gear assembly 38a similar in construction and operation to the speed change gear assemblies 28, 29 previously described. As explained with reference to the previous embodiment, the speed change gear assembly 38a varies the driving ratio between the speed of the hollow shaft 15a and the main shaft 14a through selective engagement of a pair of couplings 118a, 120a.

The main shaft 14a drives a pair of planetary gear sets 26a, 27a in a manner identical to that of the embodiment previously described. A sprocket wheel 45a, 46a which engages the vehicle track is driven from the carrier of the differential gear sets 27a, 26a, respectively. Multidisc brake assemblies 130a are provided on the shaft which drives the sprocket wheels 45a, 46a for vehicle braking purposes.

The transmission 100a of this embodiment includes a power take-off 30a and auxiliary flow brake 34a of a construction identical to that of the embodiment previously described.

The steering mechanism of this embodiment includes a steering drive unit 35a which is mounted above the main shaft 14a and the hollow shaft 15a and positioned in a space partially enclosed by the converter and the reversing clutches in a manner identical to that of the previous embodiment. The steering drive unit 35a is driven in a manner identical to that of the steering drive 25 through a pair of gears 18a, 19a from the primary side of the torque converter 3a but need not include a self contained reversing mechanism.

The output of the steering drive unit 35a includes a bevel gear 20a which drives a pair of clutches 36a, 37a through a pair of opposed bevel gears 21a, 22a, respectively. Each of the steering clutches 36a, 37a will thus rotate in opposite directions. Depending upon which steering clutch is engaged, a pair of neutral shaft portions 23a and 24a will rotate in either of two directions. Because both of the neutral shaft portions 23a, 24a will be rotating in the same direction, an idler gear 138a is provided intermediate a spur gear which interconnects the neutral shaft 24a and the sun gear 124a of the planetary gear set 27a. Thus, the sun gears of the planetary gear sets 26a, 27a will be driven in opposite directions.

Figure 4:
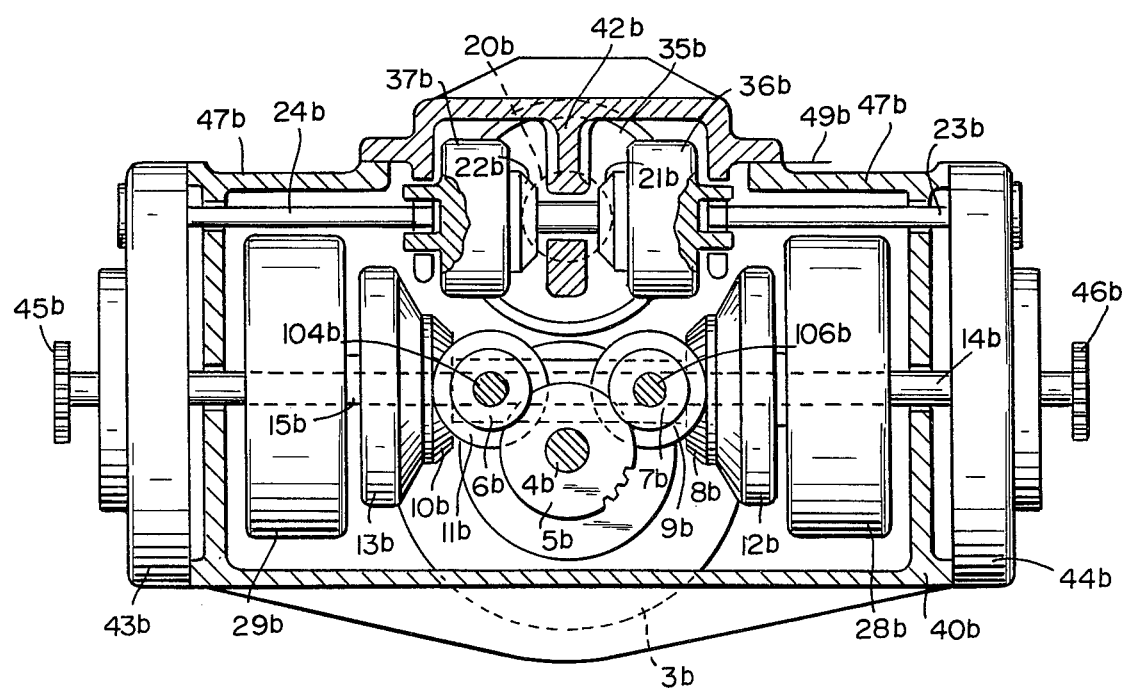
FIG. 4 is a transverse cross-sectional view through a transmission system constructed in accordance with a further embodiment as assembled in a casing, and wherein the speed change gear assembly of the first embodiment and the steering unit of the second embodiment are employed.

A still further embodiment of the invention is illustrated in FIG. 4. In this embodiment, like numerals denote corresponding components of the prior embodiments bearing the suffix "b" however. A compact transmission 100b is provided with a pair of planetary speed change gear assemblies 28b, 29b interconnecting a hollow shaft 15b with a main shaft 14b in a manner identical to that of the embodiment of FIGS. 1 and 3. The transmission of this embodiment differs, however, from that of the embodiment of FIGS. 1 and 3 in that a steering mechanism as provided in the embodiment of FIG. 2 is employed. The steering mechanism includes a steering drive unit 35b positioned and driven in a manner identical to that of the steering drive unit 35a. Furthermore, the steering drive output engages a pair of neutral shaft portions 23b, 24b through a pair of reversing steering clutches 36b, 37b. All other aspects of this embodiment are substantially the same as those of the first described embodiment.

Referring again to FIG. 4, further details of the transmission casing can be observed. It will be seen that the upper casing 42b which carries the steering drive unit 35b as a complete subassembly is positioned over and mounted to the lower casing 40b along a horizontal parting line 49b. The parting line 49b defines an access aperture in an upper wall 47b of the lower casing 40b. Also shown in FIG. 4 are a pair of housings 43b, 44b which contain the planetary differential gears 26b, 27b.

From the foregoing, it will be appreciated that the transmission of the present invention provides great versatility for variations in transmission size and gear configurations while minimizing size and weight. For example, the speed change gear assemblies may be provided between the main shaft and the hollow shaft on either or both sides of the converter output shaft. It is thus possible to obtain symmetrical or asymmetrical T or L shaped gear systems.

Thus, it will be seen that there is provided a compact transmission for tracked vehicles which achieves the objects of the present invention and which is well adapted to meet the conditions of practical use.

As various changes might be made in the invention as above set forth, it is to be understood that all matter herein described or shown in the accompanying drawings is to be interpreted as illustrative and not in a limiting sense.

Having thus described the invention, there is claimed as new and desired to be secured by Letters Patent:

1. A transmission system for a tracked vehicle, the transmission system comprising a hydrodynamic torque converter having an output shaft, a transmission main shaft journalled for rotation along an axis transverse to the converter shaft axis, differential gear sets for engagement with the vehicle tracks, the differential gear sets being driven by the main shaft and gearing means interconnecting the converter shaft with the main shaft, the converter shaft extending across and beyond the main shaft at an elevation below the main shaft, the gearing means engaging a zone of the converter shaft, the zone being spaced from the converter a distance greater than the distance between the converter and the main shaft, the gearing means including a reversing mechanism driven by the converter shaft, the reversing mechanism comprising clutch means, and speed change means interconnecting the reversing mechanism and the main shaft, the speed change means including a hollow shaft coaxial with the main shaft and planetary gear means interconnecting the main shaft with the hollow shaft, the transmission system further including a steering mechanism, the steering mechanism comprising a drive unit and a neutral shaft, the neutral shaft being in engagement with the differential gear sets, the neutral shaft having an axis parallel to the axis of the main shaft and spaced from the converter a distance greater than the distance between the main shaft and the converter, the drive unit being positioned above the main shaft, the converter being adjacent one side of the main shaft and the zone of the converter shaft which engages the gearing means being adjacent the opposite side of the main shaft, whereby the transmission system is of reduced length.

2. A transmission system for a tracked vehicle constructed in accordance with claim 1 wherein the reversing mechanism includes a pair of reversing clutches, the reversing clutches being positioned for rotation concentric with the main shaft and spaced from one another, the steering drive unit being at least partially positioned within an area between the reversing clutches and the converter.

3. A transmission system for a tracked vehicle constructed in accordance with claim 2 wherein the gearing means includes a pinion in engagement with the zone of the converter shaft and a bevel gear drive associated with each reversing clutch.

4. A transmission system for a tracked vehicle constructed in accordance with claim 2 wherein the transmission system includes a lower casing and an upper casing, the steering drive unit being mounted to the upper casing, the converter, the main shaft and the gearing means being positioned within the lower casing, the steering drive unit and the upper casing forming a separate replaceable subassembly unit, whereby assembly and repair are facilitated.

5. A transmission system for a tracked vehicle constructed in accordance with claim 4 wherein the steering neutral shaft is journalled for rotation within the lower casing.

6. A transmission system for a tracked vehicle constructed in accordance with claim 1 wherein the speed change means comprises a pair of planetary gear means, each planetary gear means being positioned between a reversing clutch and a differential gear set.

7. A transmission system for a tracked vehicle constructed in accordance with claim 1 further including a flow brake, drive means interconnecting the flow brake with the primary side of the hydrodynamic torque converter whereby improved braking efficiency at low vehicle speeds is attained.

8. A transmission system for a tracked vehicle constructed in accordance with claim 7 wherein the drive means includes a shaft in gearing engagement with the primary side of the torque converter, the shaft further including power take-off means for driving accessory devices.

9. A transmission system for a tracked vehicle constructed in accordance with claim 3 wherein the gearing means comprises cylindrical pinions and bevel gears connecting the converter shaft with each reversing clutch.

10. A transmission system for a tracked vehicle constructed in accordance with claim 1 further including power take-off means, the take-off means being arranged above the converter and including a shaft mounted about a vertical axis, a flow brake, the vertical shaft functioning as a rotor shaft for the flow brake, means drivingly interconnecting the vertical shaft and the primary side of the converter.

11. A transmission system constructed in accordance with claim 10 wherein the means drivingly interconnecting the vertical shaft and the primary side of the converter includes gearing means interconnecting the steering drive unit and the primary side of the converter and bevel gear means interconnecting the vertical shaft and the primary side of the steering drive unit.

12. A transmission system for a tracked vehicle, the transmission system comprising a hydrodynamic torque converter having an input shaft and an output shaft, a transmission main shaft journalled for rotation along an axis transverse to the axis of the converter output shaft, differential gear sets for engagement with the vehicle tracks, the differential gear sets being driven by the main shaft, gearing means interconnecting the converter output shaft with the main shaft, and a steering mechanism comprising a drive unit and a neutral shaft, the neutral shaft being in engagement with the differential gear sets, means interconnecting the converter input shaft with the drive unit and means interconnecting the drive unit with the neutral shaft, the transmission system further including a lower casing and an upper casing, the steering drive unit being mounted to and carried by the upper casing, the converter, the main shaft and the gearing means being positioned within the lower casing, each interconnecting means comprising at least two gears one of which is carried by the upper casing, the steering drive unit, the upper casing and the gears carried by the upper casing forming a separate replaceable subassembly unit, both interconnecting means being disengaged when the upper casing is lifted from the lower casing and being engaged when the casings are positioned together, whereby assembly and repair are facilitated.

13. A transmission system for a tracked vehicle constructed in accordance with claim 12 wherein the neutral shaft is journalled for rotation within the lower casing.

14. A transmission system for a tracked vehicle constructed in accordance with claim 13 wherein the neutral shaft comprises a pair of shaft positions journalled for rotation along a common axis, and the interconnecting means between the drive unit and the neutral shaft comprises three bevel gears.

15. A transmission system for a tracked vehicle constructed in accordance with claim 14 wherein a bevel gear is fixed to each neutral shaft portion for rotating the neutral shaft portions in opposite directions.

16. A transmission system for a tracked vehicle constructed in accordance with claim 14 wherein the steering mechanism includes a pair of steering clutches engaging the neutral shaft and bevel gear means interconnecting the steering drive unit and the steering clutches.

* * * * *